(12) United States Patent
Adamson et al.

(10) Patent No.: US 7,814,963 B2
(45) Date of Patent: Oct. 19, 2010

(54) TRACTOR COOLING SYSTEM

(75) Inventors: William H. Adamson, Naperville, IL (US); Stephen M. Balcom, Naperville, IL (US); Daniel A. Morey, Mundelein, IL (US); Daniel M. Ruedinger, Oak Creek, WI (US)

(73) Assignee: CNH America LLC, New Holland, PA (US)

( * ) Notice: Subject to any disclaimer, the term of this patent is extended or adjusted under 35 U.S.C. 154(b) by 340 days.

(21) Appl. No.: 11/952,272

(22) Filed: Dec. 7, 2007

(65) Prior Publication Data

US 2008/0078525 A1 Apr. 3, 2008

Related U.S. Application Data

(62) Division of application No. 10/845,967, filed on May 14, 2004, now abandoned.

(51) Int. Cl.
*F01P 3/18* (2006.01)

(52) U.S. Cl. .............. 165/41; 165/51; 165/140; 123/563; 123/41.31; 123/41.49; 180/68.1; 180/68.4; 60/599

(58) Field of Classification Search .............. 165/41, 165/51, 140; 123/563, 41.31, 41.49; 180/68.1, 180/68.4; 60/599
See application file for complete search history.

(56) References Cited

U.S. PATENT DOCUMENTS

| 3,203,499 | A | | 8/1965 | Bentz et al. |
| 4,702,079 | A | | 10/1987 | Saito et al. |
| 4,736,727 | A | * | 4/1988 | Williams .............. 123/563 |
| 5,234,051 | A | * | 8/1993 | Weizenburger et al. ....... 165/41 |
| 5,634,525 | A | * | 6/1997 | Templeton et al. ....... 180/69.24 |
| 5,816,350 | A | | 10/1998 | Akira et al. |
| 6,129,056 | A | | 10/2000 | Skeel et al. |
| 6,401,801 | B1 | | 6/2002 | Dicke |
| 6,543,525 | B2 | * | 4/2003 | Kalbacher .............. 165/140 |
| 6,546,919 | B2 | | 4/2003 | Callas et al. |
| 6,564,857 | B1 | | 5/2003 | Zobel et al. |
| 6,588,189 | B2 | | 7/2003 | Horejsi et al. |
| 6,634,418 | B2 | | 10/2003 | Wooldridge |
| 6,817,404 | B2 | | 11/2004 | Frana-Guthrie et al. |
| 6,880,656 | B2 | | 4/2005 | Pfusterschmid et al. |

FOREIGN PATENT DOCUMENTS

| GB | 229967 | | 3/1925 |
| JP | 61060326 | | 3/1986 |
| JP | 61060380 | | 3/1986 |
| JP | 05248239 A | * | 9/1993 |
| JP | 10103065 A | | 4/1998 |
| JP | 11301514 A | | 11/1999 |
| JP | 2000120438 | | 4/2000 |
| JP | 2001336423 | | 12/2001 |

* cited by examiner

*Primary Examiner*—John K Ford
(74) *Attorney, Agent, or Firm*—Patrick M. Sheldrake; Michael G. Harms

(57) ABSTRACT

A cooling system for a work vehicle is disclosed that includes first and second heat exchangers disposed one above the other to create two discrete flow paths. The upper heat exchanger is an engine water cooler and the lower heat exchanger may be an intercooler, an oil cooler or a refrigerant condenser. The lower heat exchanger is disposed forward of the upper heat exchanger. Additional heat exchangers may be positioned in front of the first and second heat exchangers to provide additional cooling. The first and second heat exchanger may be cross-flow heat exchangers conducting the fluid to be cooled laterally through the core of the heat exchanger.

7 Claims, 5 Drawing Sheets

TRACTOR COOLING SYSTEM

This divisional application claims priority under 35 U.S.C. §120 from co-pending U.S. patent application Ser. No. 10/845,967 filed on May 14, 2004 by William H. Adamson et al. with the same title, the full disclosure of which is hereby incorporated by reference.

FIELD OF THE INVENTION

The invention relates generally to agricultural vehicles. More particularly, it relates to agricultural tractors. Even more particularly, it relates to cooling systems for such vehicles.

BACKGROUND OF THE INVENTION

Agricultural tractors are used to tow ground working or harvesting implements through agricultural fields. Tractors closely follow crop rows or other lines of demarcation in a field in order to properly space plants during planting and to avoid crushing growing plants during harvesting.

It is important that the operator be able to see around the vehicle, including in front of the vehicle with little or no restriction. To follow crop rows closely, the operator's good vision in front of the vehicle is essential.

Modern tractors are increasing in size resulting in larger more vision-obstructing hoods. As engine horsepower increases and the load capacity of the vehicle increases, tractors have increased proportionately in size, resulting in higher operator compartments, longer and higher hoods, and increasingly obstructed operator vision directly in front of him, where he most needs to see.

Newer hood arrangements are needed that lower the profile of the hood permitting the operator to see objects close to the front of the tractor. To provide improved vision, the newly designed vehicles must keep existing low hood lines at the front of the hood as the rest of the vehicle increases in size.

Lowering is possible only if the internal components are reconfigured to make room for the lowered hood. The traditional configurations of engine, heat exchangers and chassis have to be modified to relocate or reposition under-hood components in such a way that the front of the hood can be lowered.

The most important components to be reconfigured are those that are right at the front of the vehicle, particularly the heat exchangers. The heat exchangers are located at the very front of the vehicle underneath the leading edge of the hood adjacent the front grille. Their size is generally proportional to the output of the engine, and thus as the engine increases in power, the heat exchangers increase in size. Since they are located right at the front of the engine and are oriented vertically, they are the primary structures responsible for blocking the operator's view down the hood.

What is needed, therefore, is a tractor cooling system using an improved heat exchanger configuration that will permit the forward end of the tractor's hood to be lowered and the operator's vision improved. It is an object of this invention to provide such an improved heat exchanger configuration and cooling system.

SUMMARY OF THE INVENTION

In accordance with a first aspect of the invention, a cooling system for an agricultural tractor includes a front frame, an intercooler mounted on the frame, an engine water cooler mounted above the intercooler in a parallel air flow path.

The cooling system may include an inlet air conduit and an outlet air conduit coupled to the intercooler and extending vertically on either side of and in front of the engine water cooler. The intercooler may be a cross-flow cooler. The engine water cooler may be a cross-flow cooler. The engine water cooler may be recessed behind the intercooler.

In accordance with a second aspect of the invention, a cooling system for an agricultural tractor includes a first heat exchanger disposed in a first position adjacent to a frame of the tractor forward of a tractor engine and behind a cooling air inlet and defining a first cooling air path, and a second heat exchanger located behind and above the first heat exchanger and defining a cooling air path separate from the first cooling air path.

The first heat exchanger may be a cross-flow heat exchanger. The second heat exchanger may be a cross-flow heat exchanger. The cores of the first and second heat exchangers may be disposed both parallel to and adjacent to each other. The first and second heat exchangers may substantially fill the inlet of a fan shroud. The first and second heat exchangers may extend substantially the entire width of an under-hood space.

In accordance with a third aspect of the invention, a cooling system for a work vehicle having an elongated narrow hood disposed immediately in front of an operator's compartment, the hood having a front grille with cooling air vents, a left sidewall and a right sidewall, is provided, the system including, an engine water cooler disposed under the hood and extending from the first sidewall to the second sidewall; and a first heat exchanger disposed beneath and generally parallel to the engine water cooler.

The system may include a second heat exchanger disposed in front of the engine water cooler and the first heat exchanger to heat air entering both the engine water cooler and the first heat exchanger. The first and second heat exchangers may be selected from the set consisting of an oil cooler, a refrigerant condenser, a fuel cooler, and an intercooler. The engine water cooler and the first heat exchanger may not overlap. At least one of the engine water cooler and the first heat exchanger may be arranged for cross-flow cooling. The first heat exchanger may be selected from the group consisting of an oil cooler and an intercooler. The first heat exchanger may be a cross-flow intercooler and the engine water cooler is cross-flow.

DETAILED DESCRIPTION OF THE PREFERRED EMBODIMENTS

"Heat exchanger", as that term is used herein, means a device for cooling a stream of fluid, the exchanger having a planar core made of a plurality of parallel tubes that are configured to carry the fluid being cooled. The tubes are covered with cooling fins, rods coils or other surface area enhancement structures and gaps between adjacent tubes are provided to permit atmospheric air to be conducted through the planar core in a direction generally perpendicular to the plane of the core.

"Cross-flow", as that term is used herein, refers to the direction of flow through the core of a heat exchanger. In a cross-flow heat exchanger, the fluid being cooled travels laterally, from side to side, generally parallel to the ground, through the core of the heat exchanger.

Figure 1:
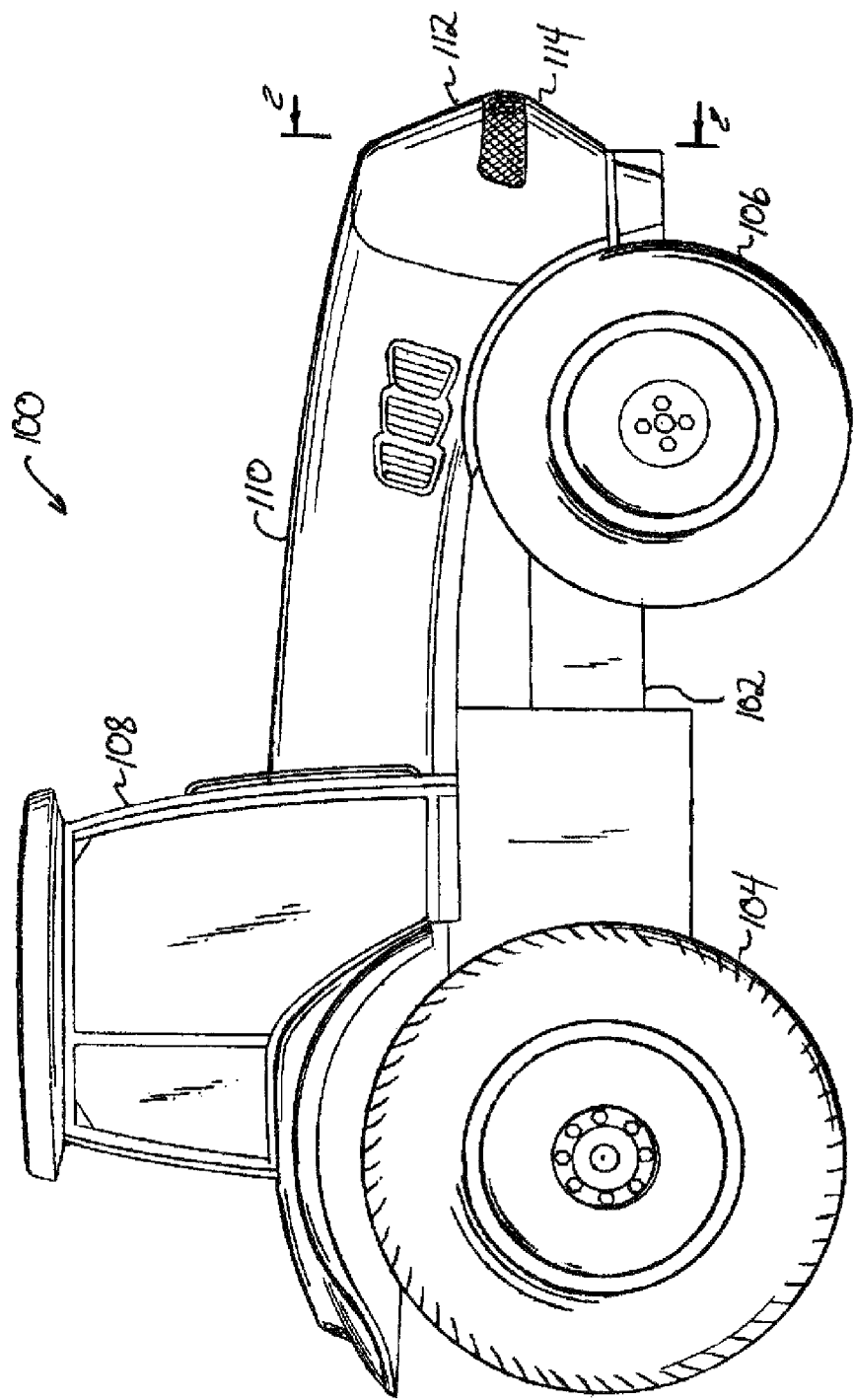
FIG. 1 is a side view of an agricultural tractor in accordance with the present invention.

Referring to FIG. 1, a tractor 100 has a chassis or frame 102 that is supported by rear drive wheels 104 and front wheels 106 (which may or may not be drive wheels).

The chassis supports an operator's compartment 108 and narrow elongated narrow hood 110 that covers an engine (not shown) and several heat exchangers (not shown) that are disposed in front of the engine and behind a front grille 112 having cooling air vents 114.

Heat exchangers are configured to cool a fluid medium by transmitting it through a core of many small tubes that has cooling fins extending from the tubes to enhance heat transfer to the surrounding air. A fan or other device is provided to draw cooling air across the cooling fins and through the core to extract heat from the tubes, and hence from the fluid medium passing through the core to be cooled.

Once cooled, the fluid medium is returned to the engine or other structure, such structures including the engine block (for engine water coolers, which are also known as radiators), the intake manifold (for charge air coolers, which are also known as "intercoolers"), the transmission (for transmission fluid coolers), refrigerant reservoirs (for refrigeration condensers) or fuel tanks (for fuel coolers).

The fluid medium may be a gas (e.g. in an intercooler), it may be a liquid (e.g. in an engine water cooler or radiator, a fuel cooler, transmission fluid cooler or engine oil cooler), or it may be both a gas and a liquid (e.g. in a refrigerant condenser, in which the fluid enters as a gas and leaves as a liquid).

Whatever the form of heat exchanger discussed herein, whether called a condenser, a radiator or a cooler, all have a few characteristics in common: the cooling fluid, i.e. the fluid that extracts the heat, is atmospheric air, the structure of the core is planar, and the cooling air passes through the core generally perpendicular to the plane of the core.

Figure 2:
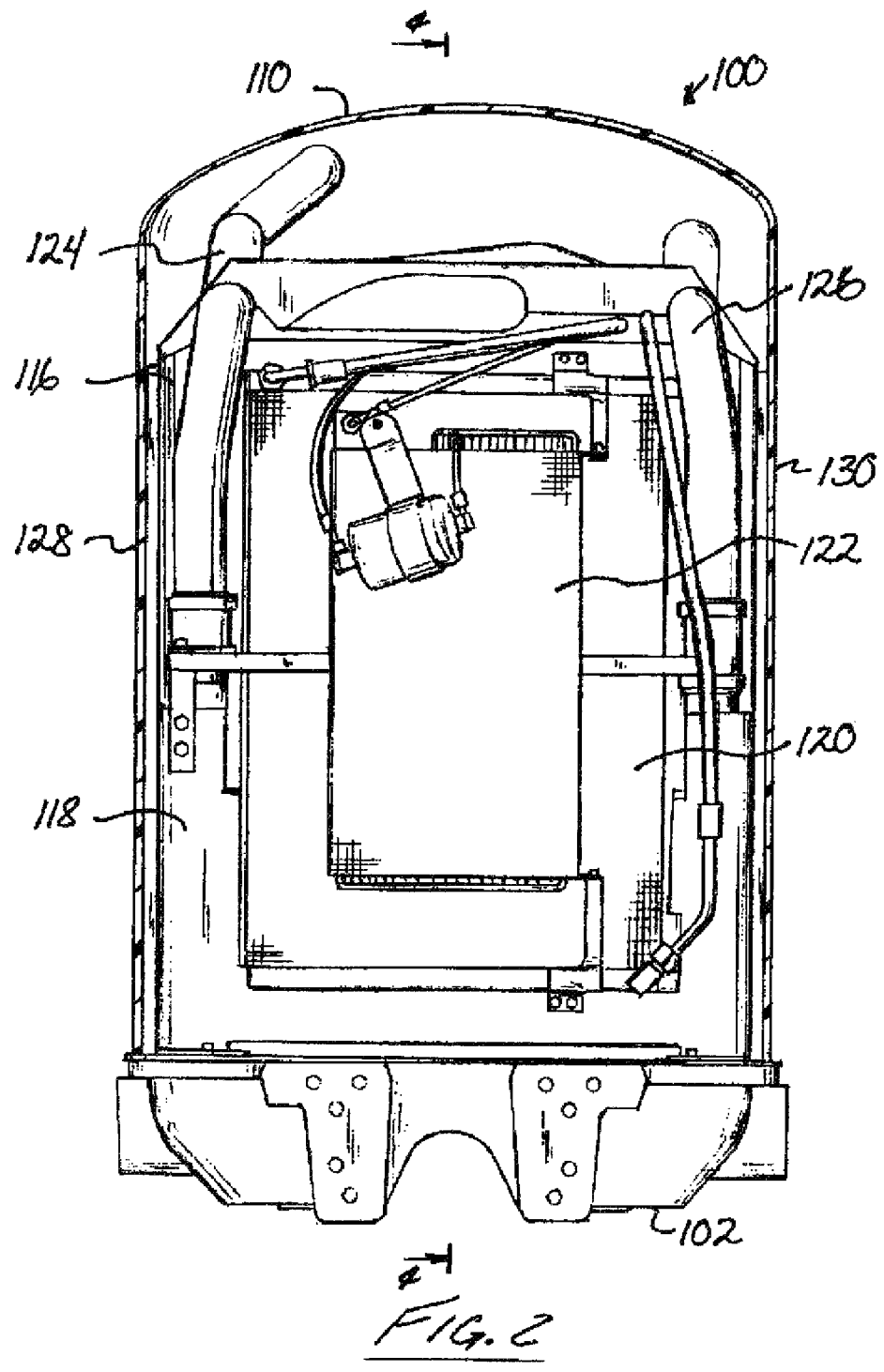
FIG. 2 is a cross-sectional front view of the tractor of FIG. 1 taken at section line 2-2 in FIG. 1.
Figure 3:
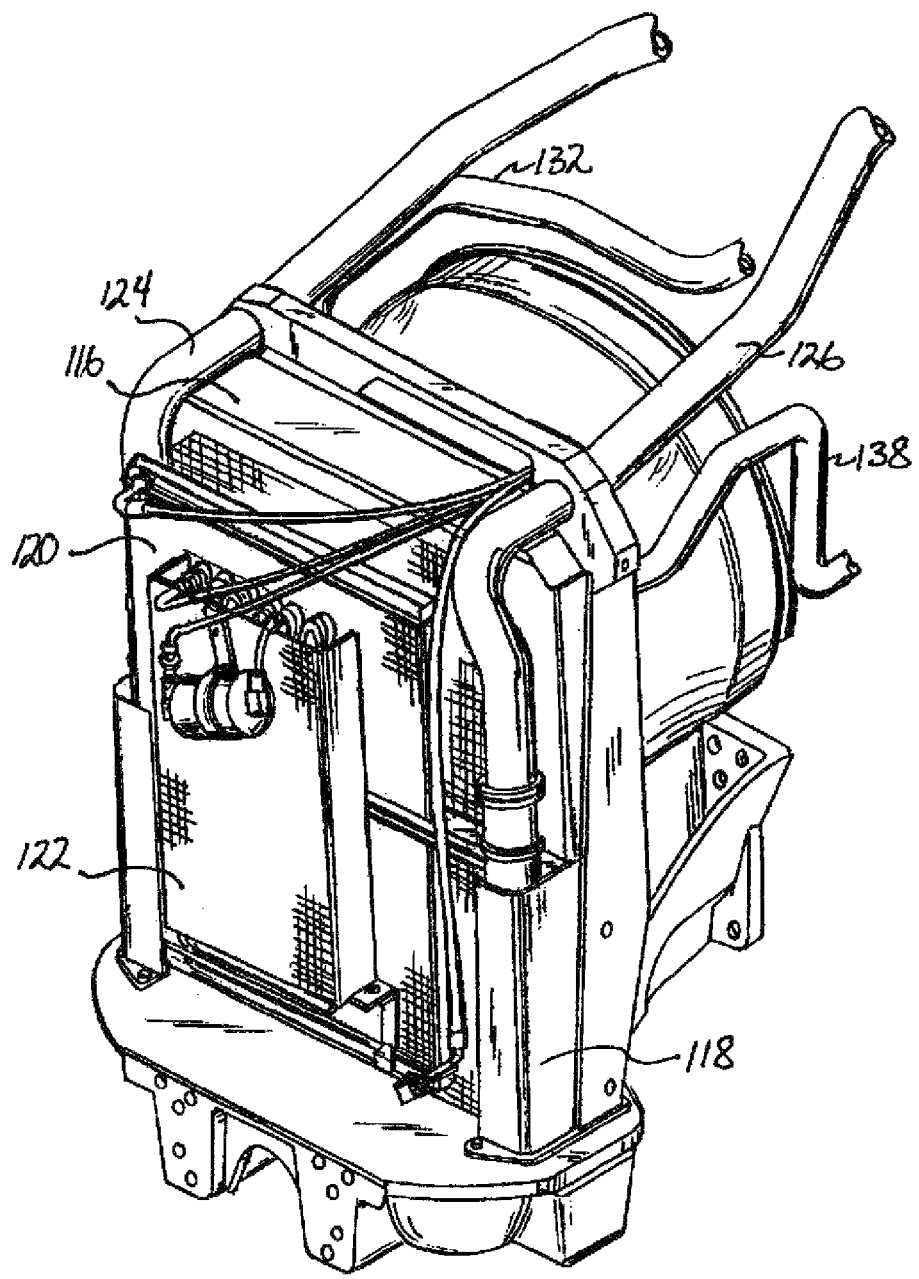
FIG. 3 is a front perspective view of the tractor of the foregoing FIGURES with the hood removed and showing the arrangement of heat exchangers and heat exchanger conduits.

In FIG. 2, four heat exchangers are illustrated: an engine water cooler or "radiator" 116, a charge air cooler or "intercooler" 118, a refrigerant condenser and fuel cooler 122, and a transmission fluid or engine oil cooler 120.

The front-most heat exchanger is a combined refrigerant condenser and fuel cooler 122. Like all the pictured heat exchangers, it extends both vertically and laterally (side-to-side). It is different from the other heat exchangers in that it is made to simultaneously cool two separate and distinct fluids at the same time: refrigerant and tractor fuel. It has two discrete tubes for carrying two different fluids through a single core that is made of both tubes coiled together. One tube is for refrigerant and has a refrigerant inlet and a refrigerant outlet at its ends. The other tube is for tractor fuel and has a fuel inlet and fuel outlet at its ends. The two tubes define two fluid flow paths that are never comingled, but are always separate. Thus item 122 is simultaneously a refrigerant condenser and a tractor fuel cooler as well, and whatever air cools the condenser cools the fuel cooler as well.

A vector drawn perpendicular to the cores of all four heat exchangers extends generally fore-and-aft, parallel to the straight-ahead direction of travel of the vehicle.

The next heat exchanger is the engine and transmission oil cooler 120. This heat exchanger is directly behind and larger than condenser 122. The two heat exchangers 120,122 are arranged so that all air passing through the condenser 122 also passes through oil cooler 120. However, not all air passing through oil cooler 120 passes through condenser 122.

The next heat exchangers are the charge air cooler or intercooler 118 and the engine water cooler or radiator 116. These heat exchangers are in an over-and-under arrangement as seen in FIG. 1: Engine water cooler 116 is on top, and intercooler 118 is on the bottom. These two heat exchangers are disposed in parallel with regard to the flow of cooling air. Cooling air passing though the engine water cooler 116 bypasses the intercooler 118, and cooling air passing though the intercooler 118 bypasses the engine water cooler 116.

The two heat exchangers 116,118 therefore define two separate, distinct and parallel flow paths for cooling air. This parallel arrangement is of particular advantage in the present application. The intercooler 118 and engine water cooler 116 both have high heating loads. "Heat load" refers to the amount of heat each must transfer from the hot fluid medium to the cooler atmospheric air per unit time. Of the four heat exchangers shown in the FIGURES, the engine water cooler 116 and the intercooler 118 have the highest heat loads, loads that are greater than both the oil cooler 120 and the condenser 122. Heat transfer from a heat exchanger to the atmosphere is a function of the temperature of the air to which heat is dumped, and the area of the heat exchanger core. The cooler the air passing through the heat exchanger, the more heat the air can absorb and the smaller the heat exchanger core necessary to transfer that amount of heat. By arranging the engine water cooler 116 and the intercooler 118 in parallel, the air each gets is only heated by the condenser 122 and the oil cooler 120. The cooling air entering the engine air cooler and the intercooler is still relatively cool. Each heat exchanger can therefore be made much smaller since the inlet air is cool. Since the heat exchangers can be made smaller, they can also be stacked one on top of the other in the over-and-under arrangement shown in FIG. 2. In an alternative design, if air entering the engine water cooler were already preheated by having previously passed through the intercooler, it would be so hot that a much larger engine water cooler would be required.

The intercooler 118 has an inlet conduit 124 and an outlet conduit 126 that are disposed on either side of the engine compartment adjacent to the sidewalls 128, 130 of the hood. These conduits conduct hot air from the engine's turbocharger (not shown) through the intercooler, and then back to the intake manifold (not shown) of the engine.

Conduit 124 extends vertically from the left side of the intercooler 118 vertically along the left side of engine water cooler 116, adjacent to left hood sidewall 128, and then over the top of engine water cooler 116 and back to the engine (not shown). Conduit 126 extends vertically from the right side of the intercooler 118 vertically along the right side of engine water cooler 116, adjacent to the right hood sidewall 130, and then over the top of engine water cooler 116 and back to the engine (not shown). Conduits 124 and 126 are coupled to and between the turbocharger and the intake manifold (not shown).

Figure 5:
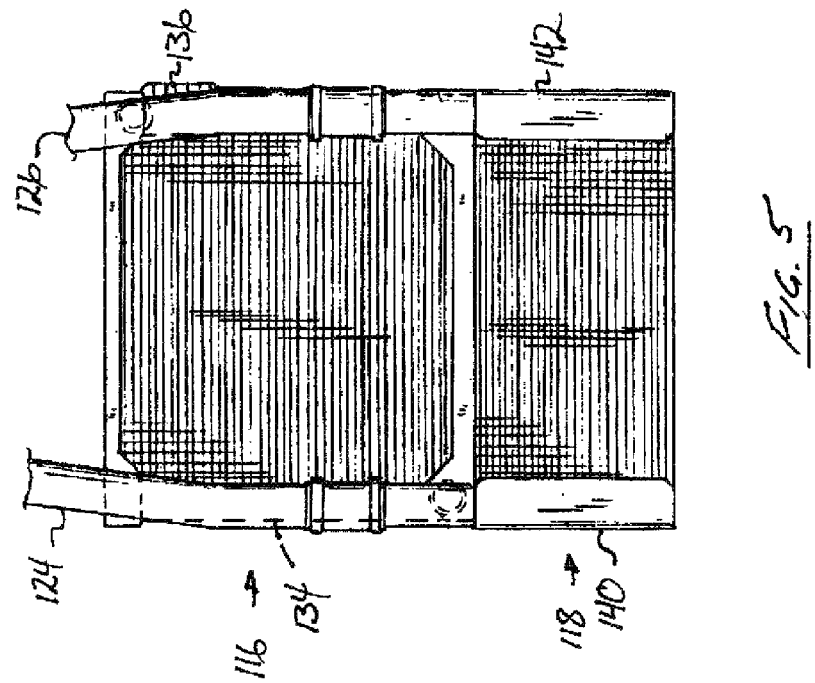
FIG. 5 is a cross-sectional front view of the engine water cooler and the intercooler taken at section line 5-5 in FIG. 4.
Figure 6:
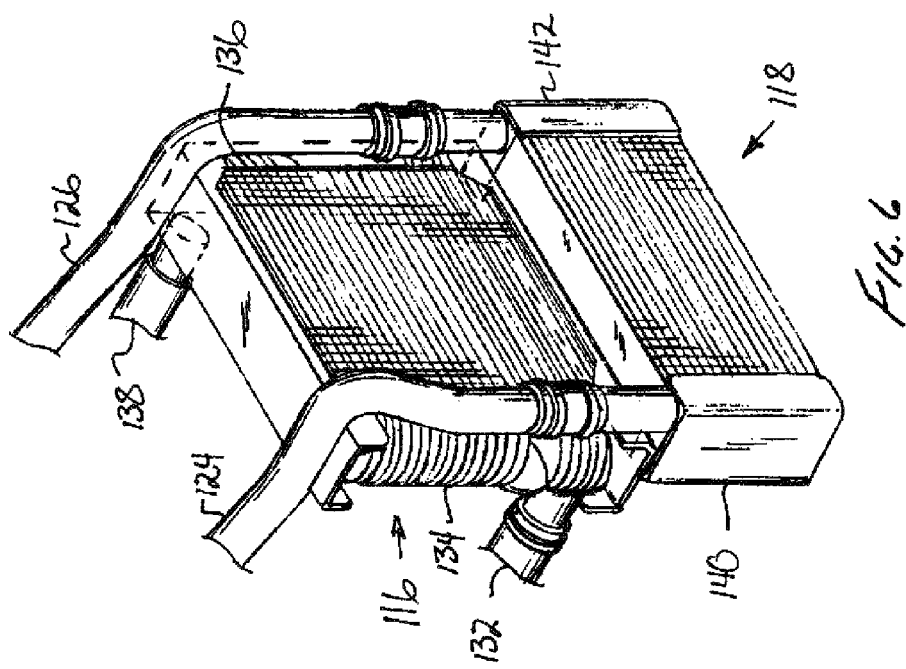
FIG. 6 is a perspective view of the components illustrated in FIG. 5.

It might appear that conduits 124, 126 block air flow through at least a portion of the engine water cooler 116, but this is not the case. Engine water cooler 116 is a cross-flow heat exchanger, in which the hot water entering cooler 116 from an inlet conduit 132 (FIG. 6) fills a tank or plenum 134 disposed vertically on one side of cooler 116, then travels through several laterally extending cooling tubes in the cooler 116 heat exchanger core). Water leaving the cooling tubes of the cooler 116 core is gathered into a second vertically extending tank or plenum 136 on the other side of the core and thence conducted away from cooler 116 by an engine cooler 116 outlet conduit 138 (FIG. 6). As best seen in FIGS. 5 and 6, intercooler conduits 124, 126 are disposed directly in front of engine water cooler 116 tanks 134, 136, and therefore do not block air flow through the core of engine water cooler 116.

The vertical arrangement of intercooler conduits 124, 126 on either side of engine water cooler 116 is possible because intercooler 118 is also a cross-flow heat exchanger. Intercooler 118 has two vertically oriented tanks 140, 142 that are disposed on either side of the core of intercooler 118. As in the case of the engine water cooler 116, tanks 140, 142 couple left and right edges of the intercooler core to conduits 124,126.

Figure 4:
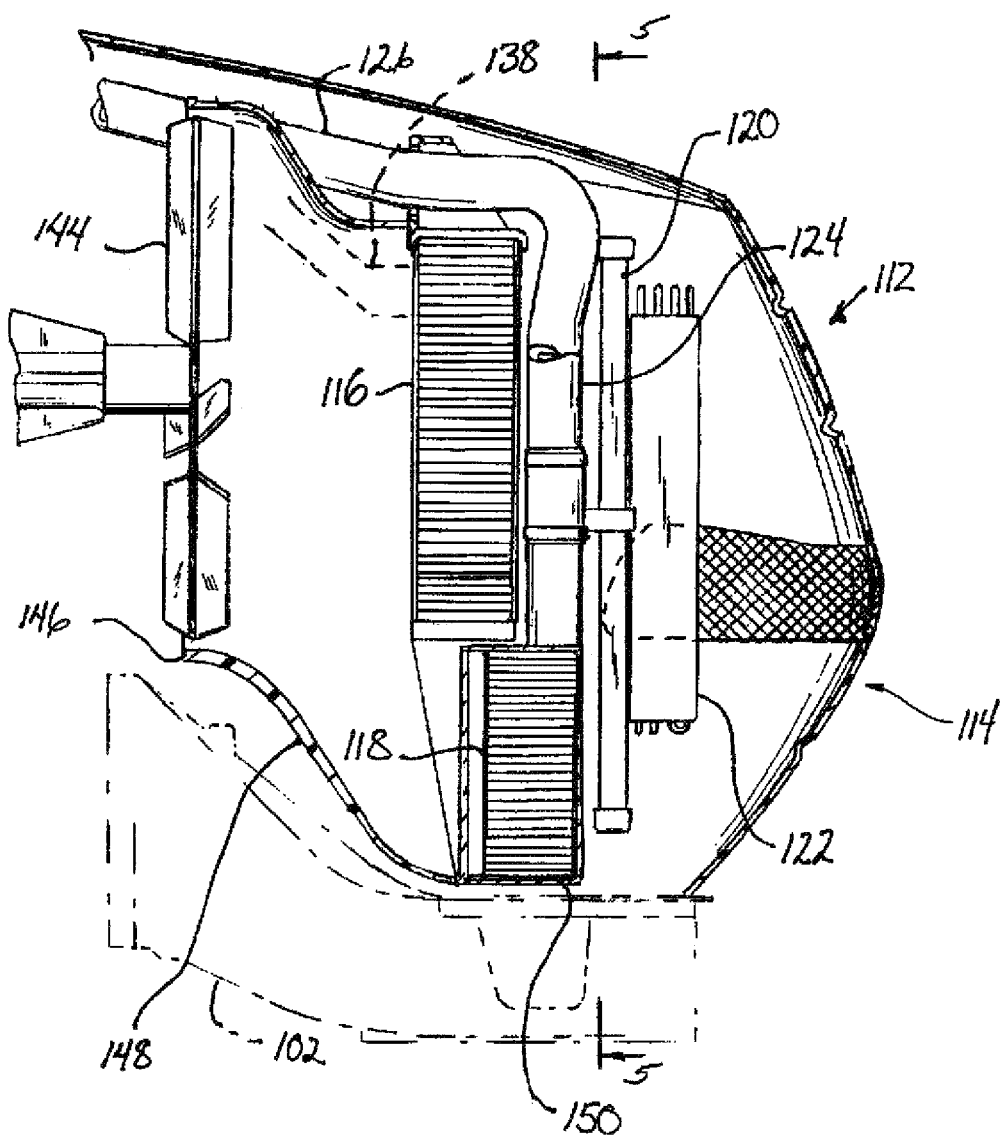
FIG. 4 is a cross-sectional side view of the tractor of the foregoing FIGURES taken at section line 4-4 in FIG. 2 through the middle of the heat exchangers and showing the stacked arrangement of the heat exchangers.

We now refer to FIG. 4, a side view of the engine compartment partially cutaway to see the orientation of the heat exchangers. In this view, the core of engine water cooler 116 can be seen in cross section disposed above and slightly to the rear of intercooler 118. The top of intercooler 118 and the bottom of engine water cooler 116 are disposed in abutting relation such that air passes through either the engine water cooler 116 or the intercooler 118, but not both. They define two parallel and adjacent cooling air flow paths. Air is pulled through all four heat exchangers 116, 118, 120, 122 by a fan 144 that is driven by the tractor engine (not shown). The fan is disposed in one end 146 of a fan shroud 148. Engine water cooler 116 and intercooler 118 are disposed in the other end 150 of the fan shroud. When fan 144 turns, it draws air through vents 114 in hood 110. The air is drawn backward, through condenser 122 and oil cooler 120. It is then drawn through either engine water cooler 116 or intercooler 118. Once it has passed through one of these two, it travels the length of shroud 148, and is pulled through fan 144 at which point it exhausts into the engine compartment around the engine.

It can be seen in FIG. 4 that air is either (1) pulled directly from the outside into engine water cooler 116 and intercooler 118, or (2) it is pulled first through the oil cooler 120 and then through either the engine water cooler 116 or the intercooler 118, or (3) it is pulled through both the condenser 122 and the oil cooler 120 and then through either of the engine water cooler 116 and the intercooler 118.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

We claim:

1. A cooling system for a work vehicle having an elongated narrow hood located at a forward end of the vehicle and having opposing forward and rearward ends defining a longitudinal axis, the hood having a front grille with cooling air vents, a left sidewall and a right sidewall, the system comprising:
    an engine water cooler disposed under the hood behind the front grille and forward of and fluidly connected to the work vehicle engine; and
    a first heat exchanger disposed beneath the engine water cooler and having a parallel airflow path to the engine water cooler
    the engine water cooler having a front face offset rearwardly along the longitudinal axis from the front face of the first heat exchanger and defining a second cooling air path disposed fluidly in parallel to a cooling path through the first heat exchanger, the engine water cooler having at least one vertically extending tank on at least one of the left or right sides of the engine water cooler; and
    at least one conduit connected to the first heat exchanger forward of the front face of the engine water cooler with respect to the longitudinal axis and extending rearward over a top surface of the engine water cooler, a portion of the at least conduit extending upward from the first heat exchanger directly forward of the vertically extending tank of the engine water cooler.

2. The cooling system of claim 1, further comprising a second heat exchanger disposed along the longitudinal axis of and in the air flow path of both the engine water cooler and first heat exchanger and a portion of the at least one conduit extends from the first heat exchanger vertically past, and directly forward of, the front face of the engine water cooler through a gap between the second heat exchanger and the engine water cooler.

3. The cooling system of claim 2, wherein the first heat exchanger is an intercooler fluidly connected to a turbocharger of the vehicle.

4. The cooling system of claim 2, wherein the engine water cooler and the first heat exchanger do not vertically overlap such that the airflow path through engine water cooler is separate from the airflow path of the first heat exchanger.

5. The cooling system of claim 4, wherein at least one of the engine water cooler and the first heat exchanger is arranged for cross-flow cooling.

6. The cooling system of claim 5, wherein the first heat exchanger is selected from the group consisting of an oil cooler configured for fluid connection with a transmission of the vehicle and an intercooler configured for fluid connection with a turbocharger of the vehicle.

7. The cooling system of claim 6, wherein the first heat exchanger is a cross-flow intercooler fluidly connected to the turbocharger of the vehicle and the engine water cooler is cross-flow.

* * * * *